(12) United States Patent
Kobayashi et al.

(10) Patent No.: US 7,630,413 B2
(45) Date of Patent: Dec. 8, 2009

(54) DATA TRANSMISSION METHOD, DATA TRANSMISSION APPARATUS, AND DATA TRANSMISSION SYSTEM

(75) Inventors: Mitsuru Kobayashi, Yokohama (JP); Hiroyuki Yamaguchi, Yokohama (JP); Satoru Adachi, Yokohama (JP); Kazuo Sugimoto, Fujisawa (JP); Sadaatsu Kato, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 749 days.

(21) Appl. No.: 10/737,763

(22) Filed: Dec. 18, 2003

(65) Prior Publication Data

US 2004/0179556 A1    Sep. 16, 2004

(30) Foreign Application Priority Data

Dec. 18, 2002    (JP) .................... P2002-367287

(51) Int. Cl.
*H04J 3/04* (2006.01)
(52) U.S. Cl. .................. 370/536; 370/473; 370/474; 370/535; 370/537
(58) Field of Classification Search ............... 370/231, 370/247, 322, 364, 464, 470, 473, 489, 478, 370/480, 493, 535, 536, 537, 392, 319, 320, 370/321, 326, 344, 347, 474, 476
See application file for complete search history.

(56) References Cited

U.S. PATENT DOCUMENTS 5,231,649 A * 7/1993 Duncanson ............ 375/260
6,240,140 B1 * 5/2001 Lindbergh et al. .......... 375/260
6,335,933 B1 * 1/2002 Mallory .................... 370/394
6,411,629 B1 * 6/2002 Bentall et al. ............. 370/458
6,879,590 B2 * 4/2005 Pedersen et al. .......... 370/394

(Continued)

FOREIGN PATENT DOCUMENTS

| EP | 1 148 687 | 10/2001 |
|---|---|---|
| JP | 5-153183 A | 5/1993 |
| JP | 6-509916 A | 11/1994 |
| WO | WO 93/03569 | 2/1993 |

OTHER PUBLICATIONS

International Telecommunication Union, XP-002273718, pp. i to 3 i and pp. 1-9, "Annex H: Mobile Multilinik Operation", Nov. 2000.

*Primary Examiner*—Ricky Ngo
*Assistant Examiner*—Wei-Po Kao
(74) *Attorney, Agent, or Firm*—Oblon, Spivak, McClelland, Maier & Neustadt, L.L.P.

(57) ABSTRACT

A system for improving the transmission efficiency of channels involved in multilink communication and reducing the load of processing. A first data transmission apparatus changes the number of transmission channels involved in multilink communication from "x" to "y", acquires SS (sampling size) and SPF(samples per frame) associated with the number of transmission channels "y" from an SS/SPF table, generates multilink frames based on the acquired SS and SPF, and transmits them to a second data transmission apparatus. When it is detected that the number of transmission channels has been changed from "x" to "y", the second data transmission apparatus acquires the SS and SPF associated with the number of transmission channels "y" from the SS/SPF table, generates multilink frames based on the acquired SS and SPF, and transmits them to the first data transmission apparatus.

9 Claims, 11 Drawing Sheets

U.S. PATENT DOCUMENTS

| | | | |
|---|---|---|---|
| 6,999,429 B1* | 2/2006 | Hannu et al. | 370/328 |
| 2002/0021714 A1* | 2/2002 | Seguin | 370/469 |
| 2002/0097707 A1* | 7/2002 | Balazinski et al. | 370/351 |
| 2002/0136291 A1* | 9/2002 | Sala et al. | 375/240 |
| 2002/0146010 A1* | 10/2002 | Shenoi et al. | 370/395.1 |
| 2004/0042440 A1* | 3/2004 | McGowan | 370/345 |

* cited by examiner

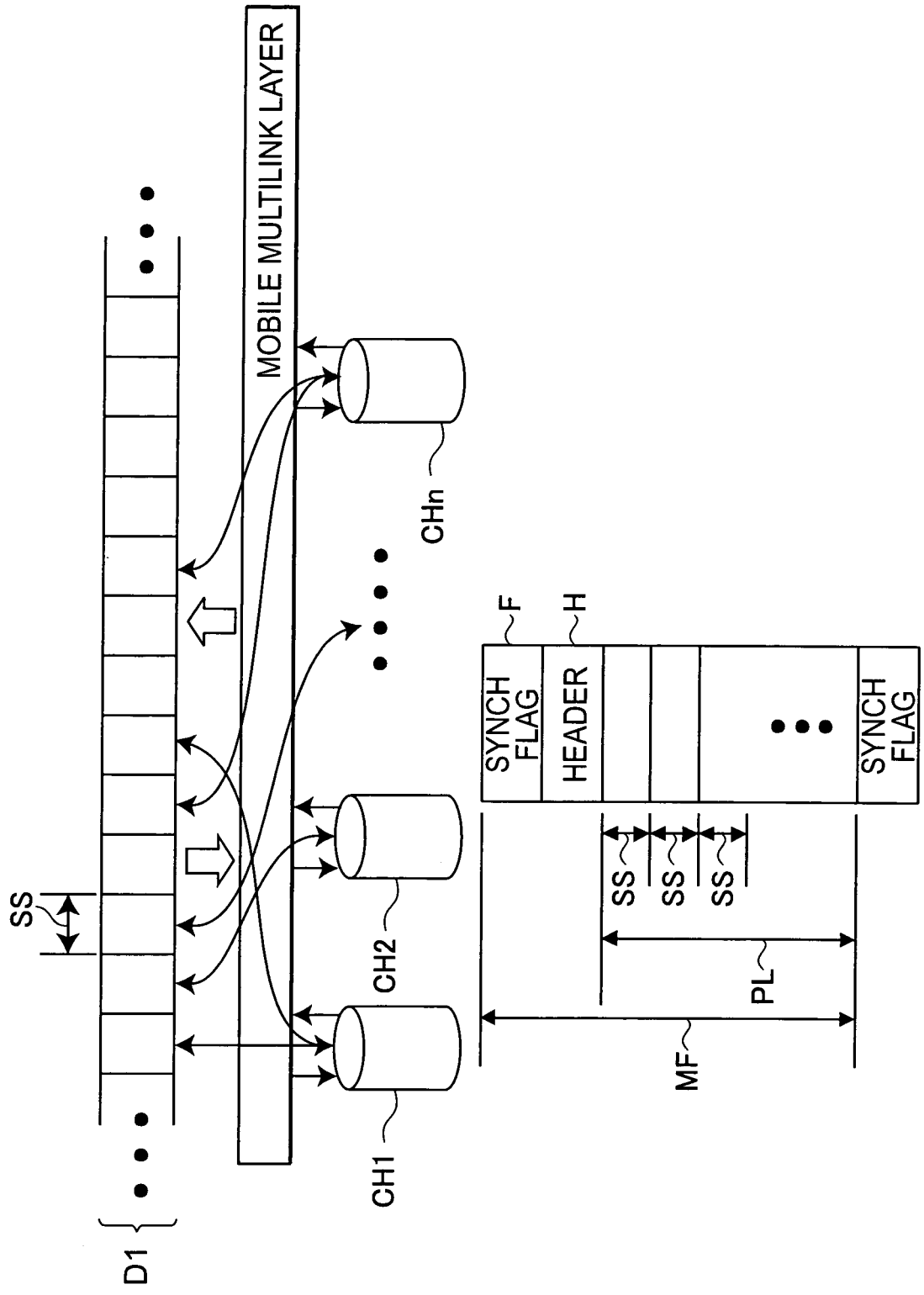

| NUMBER OF TRANSMISSION CHANNELS | SS | SPF |
|---|---|---|
| 1 | 1 | 128 |
| 2 | 1 | 255 |
| 3 | 2 | 255 |
| 4 | 4 | 255 |
| 5 | 6 | 255 |
| 6 | 8 | 255 |
| 7 | 12 | 255 |
| 8 | 16 | 255 |

| NUMBER OF TRANSMISSION CHANNELS | SS | SPF |
|---|---|---|
| 1 | 32 | 255 |
| 2 | 16 | 255 |
| 3 | 12 | 255 |
| 4 | 8 | 255 |
| 5 | 6 | 255 |
| 6 | 5 | 255 |
| 7 | 4 | 255 |
| 8 | 3 | 255 |

DATA TRANSMISSION METHOD, DATA TRANSMISSION APPARATUS, AND DATA TRANSMISSION SYSTEM

BACKGROUND OF THE INVENTION

1. Field of the Invention

The present invention relates to a data transmission method, a data transmission apparatus, and a data transmission system.

2. Related Background Art

Recommendation Series H.32x standardized by ITU-T (International Telecommunication Union-Telecommunication Standardization Sector) has been known as a real-time video communication method for visual telephones. According to this method, plural items of input data such as video data and audio data are combined into one item of data which is then communicated. Various expansion models are defined in Recommendation Series H.32x. In one of the recommendations, i.e., Recommendation H.324 Annex H, a definition is made on multilink communication in which one item of data is transmitted using a plurality of links (channels). For example, techniques associated with the recommendation H.324 Annex H are disclosed in an article titled "ITU-T Recommendation on CD-ROM", Disc-2, T-REC-H.324-200011-I!AnnH!MSW-E.zip, November, 2000 (zip file) and March, 2000 (CD-ROM).

A functional constituent for processing video and audio data by adopting Recommendation H.324 Annex H will now be described with reference to FIG. 11. A video encoding section J1 encodes an input image using a video encoding method such as MPEG4. An audio encoding section J2 encodes an input sound using an audio encoding method such as AMR. A communication control section J3 performs control over the communication system such as switching control in terms of capabilities of the communication apparatus by utilizing messages defined in Recommendation H.245. A multiplexing section J4 adopts a multiplex process according to Recommendation H.223. A mobile multilink section J5 for converting the video and audio data into one item of multiplex data performs a multilink process according to Recommendation Annex H on the multiplex data obtained through the conversion to divide it into plural items of multiplex data.

A procedure for the multilink process at the mobile multilink section J5 will now be described with reference to FIG. 2. First, multiplex data D1 is divided in SS (sampling size) bytes, and the resultant items of data are sequentially distributed to buffers for respective channels on which they are to be transmitted. When items of data each having SS bytes are accumulated in a quantity corresponding to SPF (samples per frame), those items of data are given a synchronization flag F, header information H, and CRC information for the header information to generate a multilink frame MF, and the multilink frame MF is transmitted to another terminal. As shown in FIGS. 3A and 3B, the header information H includes full header information H1 and compressed header information H2. Those pieces of header information H include a number (CT) indicating the channel on which the multilink frame is to be transmitted, a flag (L) indicating that the multilink frame is transmitted on the channel having the greatest CT value among the channels to be used as transmission channels for multilink communication, a number (SN) indicating the place of the multilink frame in the order of transmission, and a flag (FT) indicating the type of the multilink frame. The full header information H1 further includes the SS and the size of the SPF.

A procedure for a process of restoring the divided data performed at the mobile multilink section J5 will be described. First, a synchronization flag is searched for each channel and, when a synchronization flag is detected, the SN and L in the header information following the flag are referred to. At this time, if those channels have the same SN, it can be decided that multilink frames are items of data which have been transmitted at the same timing. When there is a flag L in an "ON" state, it indicates that the relevant channel is the last channel. Thus, items of data transmitted over the respective channels are synchronized, and multiplex data which have been transmitted over the channels on a divided basis can be restored to obtain the initial multiplex data. Since the number SN can have values from 0 to 7 only, synchronization may not be achieved depending on the magnitude of a transmission delay. Therefore, the SS and SPF values a reset taking into account the communication environment and the size of a buffer at the receiving end. The restored multiplex data is divided into video data and audio data according to a method in compliance with the recommendation H.223 and into items of data according to the recommendation H.245, each of the resultant data being decoded. The items of decoded data are simultaneously played to allow real-time video communication.

During the above-described multilink communication according to Recommendation H.324 Annex H, a plurality of items of data (video data, audio data, and so on) to be transmitted on each channel on a divided basis are transmitted by storing them in a multilink frame. The volume of data stored in the multilink frame is determined by the SS and SPF values included in the header information as described above. It is desirable that the SS and SPF values are varied in accordance with changes in various factors such as the state of transmission of the channel in order to improve transmission efficiency. For example, when burst errors are likely to occur, a small SS value may be set to reduce the influence of burst errors. In the case of the occurrence of a delay in a channel, the value of SS' SPF (payload) maybe increased to increase the amount of allowable delay.

SUMMARY OF THE INVENTION

However, in order to change SS and SPF values in multilink communication as described above, information indicating SS and SPF values to be set must be added to the header information of a multilink frame. Therefore, when the size of the payload or the contents of SS and SPF are frequently changed depending on the state of transmission of the channel, a problem has arisen in that transmission efficiency of the channel is reduced by the addition of the SS and SPF values to the header information. Further, when the size of the payload or the contents of SS and SPF are to be changed, it is necessary to use a synchronization flag that is different from the synchronization flag normally used and to exchange data between the transmitting end and the receiving end to allow the changes in the contents to be confirmed at both ends. This has necessitated a complicated process and resulted in the problem of an increase in the load of processing.

Such being the case, in order to solve the above-described problems, it is an object of the invention to provide a data transmission method, a data transmission apparatus, and a data transmission system which make it possible to improve the transmission efficiency of a channel during multilink communication and to reduce the load of processing.

A data transmission method according to the invention is characterized in that: a terminal at a transmitting end divides data to be transmitted and distributes the divided data among a plurality of transmission channels to transmit the data in units each having a predetermined data volume; a terminal at a receiving end receives the data distributed among and transmitted on the plurality of transmission channels and combines the received data; and both or either of the data volume and the pattern of data division are controlled based on a record of performance of transmission on each of the transmission channels.

A data transmission apparatus according to the invention is characterized in that it has: a dividing unit for dividing data to be transmitted; a transmission unit for distributing the divided data among a plurality of transmission channels to transmit the data in units each having a predetermined data volume to an external terminal; a receiving unit for receiving data distributed among and transmitted on the plurality of transmission channels from the external terminal; a combining unit for combining the data received by the receiving unit; a deciding unit for deciding a record of performance of transmission on each of the transmission channels based on the combined data; and a control unit for controlling both or either of the data volume or the pattern of data division based on a decision made by the deciding unit.

A data transmission system according to the invention is a data transmission system for transmitting and receiving between a first data transmission apparatus and a second data transmission apparatus, characterized in that: the first data transmission apparatus has a dividing unit for dividing data to be transmitted and a transmission unit for distributing the divided data among a plurality of transmission channels to transmit the data in units each having a predetermined data volume to an external terminal; and the second data transmission apparatus has a receiving unit for receiving data distributed among and transmitted on the plurality of transmission channels from the external terminal, a combining unit for combining the data received by the receiving unit, a deciding unit for deciding a record of performance of transmission on each of the transmission channels based on the combined data, and a control unit for controlling both or either of the data volume or the pattern of data division based on a decision made by the deciding unit.

In those aspects of the invention, both or either of the data volume and the pattern of data division can be controlled based on a record of performance of transmission on each of the transmission channels. Therefore, when there is a change in the record of performance of transmission of a transmission channel, both or either of the data volume and the pattern of data division can be controlled based on a record of performance of transmission after the change. It is also possible to improve transmission efficiency of a channel in multilink communication and to reduce the load of processing.

In a data transmission method according to the invention, the record of performance of transmission is preferably the number of transmission channels which are used as the plurality of transmission channels.

In this aspect of the invention, both or either of the data volume and the pattern of data division can be controlled based on the number of transmission channels used as the plurality of transmission channels. Therefore, when there has occurred a change in the number of transmission channels, both or either of the data volume and the pattern of data division can be controlled based on the number of transmission channels after the change. It is also possible to improve transmission efficiency of a channel in multilink communication and to reduce the load of processing.

In a data transmission method according to the invention, the control is preferably carried over timing for changing both or either of the data volume and the pattern of data division based on the volumes of data transmitted by the transmission channels.

In this aspect of the invention, since the timing for changing both or either of the data volume and the pattern of data division is controlled based on the volumes of data transmitted by the transmission channels, both or either of the data volume and the pattern of data division can be reliably changed even when there has occurred a delay between the transmission channels.

In a data transmission method according to the invention, the control is preferably exercised on both or either of the data volume and the pattern of data division on referring to both or either of data volumes and patterns of data division which are defined in advance in accordance with a record of performance of transmission. In a data transmission apparatus according to the invention, the control unit preferably controls both or either of the data volume and the pattern of data division with reference to both or either of data volumes and patterns of data division which are defined in advance in accordance with a record of performance of transmission. Further, in a data transmission system according to the invention, the control unit controls both or either of the data volume and the pattern of data division on referring to both or either of data volumes and patterns of data division which are defined in advance in accordance with a record of performance of transmission.

In those aspects of the invention, both or either of the data volumes and the pattern of data division can be controlled with reference to both or either of data volumes and patterns of data division which are defined in advance in accordance with a record of performance of transmission. As a result, data to be transmitted by a transmission channel is not required to include in itself information indicating the data volume stored therein, and the transmission efficiency of the channel can therefore be improved during multilink communication. Further, both or either of a data volume and a pattern of data division in accordance with a change in the number of transmission can be readily altered by referring to both or either of the data volumes and patterns of data division defined in advance. This makes it possible to change both or either of the data volume and the pattern of data division easily and to thereby reduce the load of processing.

In a data transmission method according to the invention, both or either of the data volumes and patterns of data division defined in advance are preferably determined based on a data buffer capacity of either of the terminal at the transmitting end or the terminal at the receiving end.

In this aspect of the invention, since the data volume to be transmitted by the transmission channels can be determined based on the data buffer capacity of one of the terminals, data can be transmitted during multilink communication in a data volume that is determined taking into account the buffer capacity of the terminal.

In a data transmission method according to the invention, a notification of both or either of the data volumes and patterns of data division defined in advance is preferably carried out from one of the terminal to the other. Further, the terminal having received the notification preferably notifies the other terminal of its response to the notification.

In this aspect of the invention, since data can be transmitted during multilink communication in a data volume that is determined taking into account the buffer capacities of both of the terminals, the data can be more reliably transmitted.

BRIEF DESCRIPTION OF THE DRAWINGS

FIG. 2 is an explanatory view illustrating a function of a multilink frame constituent section.

FIG. 6A shows an example of table values stored in a SS/SPF table.

FIG. 6B shows an example of table values stored in the SS/SPF table.

DESCRIPTION OF THE PREFERRED EMBODIMENTS

Figure 1:
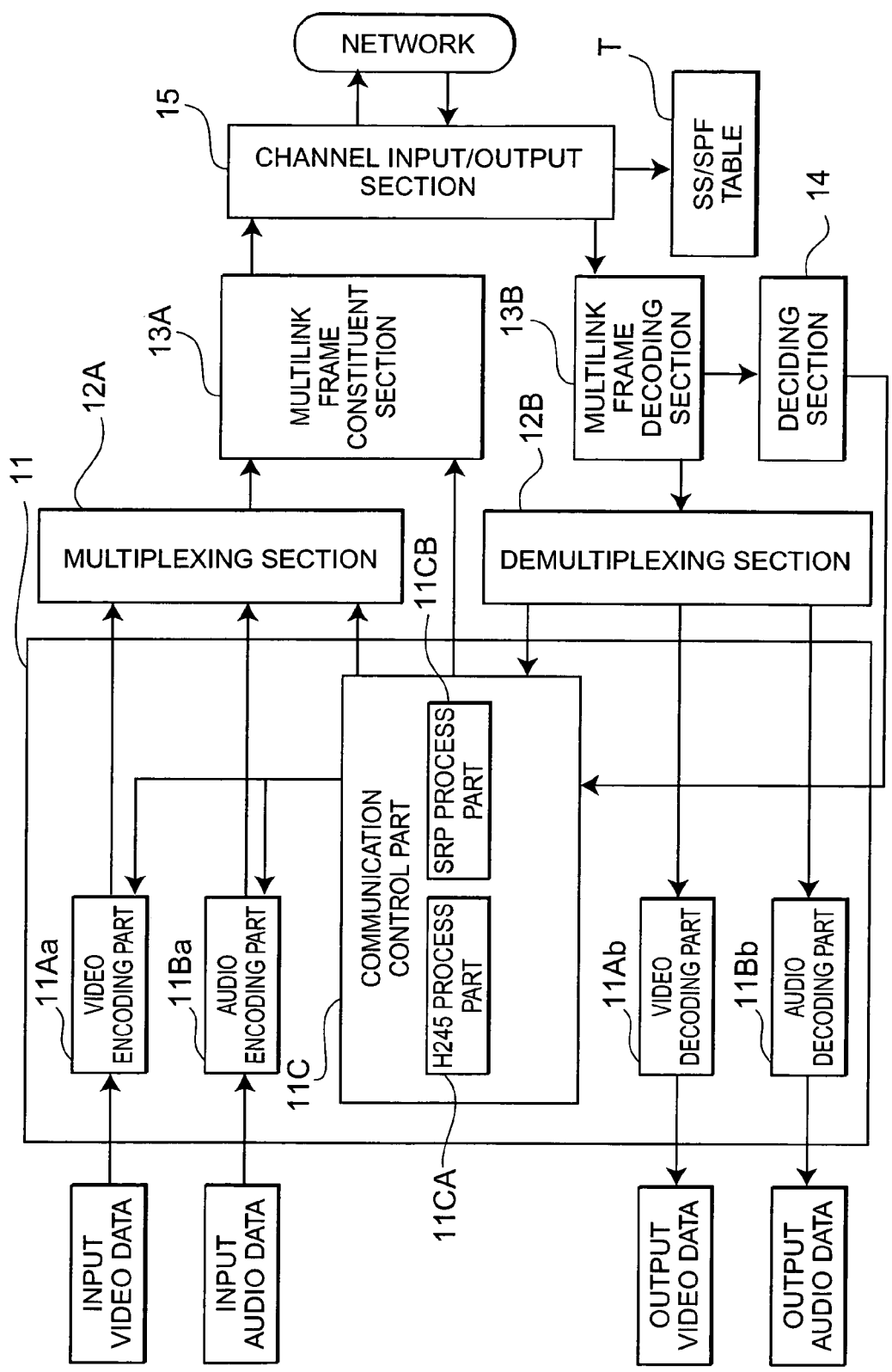
FIG. 1 is a view illustrating a functional arrangement for a data transmission apparatus according to an embodiment of the invention.

Preferred embodiments of an apparatus according to the invention will now be described with reference to the drawings. In each of the figures, the same element is indicated by the same reference numeral to avoid duplication of description.

First, an embodiment of the invention will be described. FIG. 1 is a view illustrating an exemplary functional arrangement of a data transmission apparatus 1 in the present embodiment. As shown in FIG. 1, the data transmission apparatus 1 has a data input/output section 11, a multiplexing section 12A, a demultiplexing section 12B, a multilink frame constituent section 13A, a multilink frame decoding section 13B, a deciding section 14, and a channel input/output section 15. An example of such a data transmission apparatus 1 is a multi-media communication terminal used in a television conference system or visual telephone system. The data transmission apparatus 1 in the present embodiment adopts Recommendation H. 324 Annex H which has been standardized by ITU-T.

The data input/output section 11 has a video encoding part 11Aa, a video decoding part 11Ab, an audio encoding part 11Ba, an audio decoding part 11Bb, and a communication control part 11C. The video encoding part 11Aa adopts ITU-T Recommendation H.263 or ISO/IEC MPEG (Moving Picture Experts Group)-4 as its video encoding method and encodes video data input to the data transmission apparatus 1 according to MPEG-4. The video decoding part 11Ab adopts ITU-T Recommendation H.263 or ISO/IEC MPEG-4 as its video decoding method and decodes video data output by the data transmission apparatus 1 according to MPEG-4. The audio encoding part 11Ba adopts ITU-T Recommendation G.723.1 or AMR (Adaptive Multi-Rate) method as its audio encoding method and encodes audio data input to the data transmission apparatus 1 according to the AMR method. The audio decoding part 11Bb adopts ITU-T Recommendation G.723.1 or the AMR method as its audio decoding method and decodes audio data output by the data transmission apparatus 1 according to the AMR method. Real-time video communication is made possible by simultaneously playing video data and audio data decoded in such a manner.

The communication control part 11C has an H245 process part 11CA and an SRP process part 11CB. The H245 process part 11CA adopts ITU-T Recommendation H.245 and performs various processes related to multi-media communication with another data transmission apparatus 1 such as a channel assignment process and a message exchange process. The SRP process part 11CB adopts SRP (Simple Retransmission Protocol) which is a protocol for retransmission procedures defined in ITU-T Recommendation H.324 and performs a data retransmission process using the NSRP (Numbered SRP) or CCSRL (Control Channel Segmentation and Reassembly Layer) procedure when a transmission error occurs.

The multiplexing section 12A adopts ITU-T Recommendation H.223 (H.223 Annex A or H.223 Annex B may alternatively be adopted). It multiplexes video data and audio data encoded at the data input/output section 11 into one item of data to generate multiplex data and transmits the multiplex data thus generated to the multilink frame constituent section 13A. The demultiplexing section 12B adopts ITU-T Recommendation H.223 (H.223 Annex A or H.223 Annex B or may alternatively be adopted). It demultiplexes multiplex data combined at the multilink frame decoding section 13B into video data and audio data and transmits the demultiplexed video data and audio data to the data input/output section 11.

The multilink frame constituent section 13A adopts ITU-T Recommendation H.324 Annex H and divides multiplex data which have been multiplexed at the multiplexing section 12A in accordance with the number of channels capable of communication on a multilink communication basis (a dividing process). The multilink frame decoding section 13B combines data received from another data transmission apparatus through a plurality of channels into one item of data to restore multiplex data (a combining process).

The dividing process at the multilink frame constituent section 13A will now be described with reference to FIG. 2. First, the multilink frame constituent section 13A divides data D1 having been multiplexed at the multiplexing section 12A into units each having SS (Sampling Size) bytes. Next, the multilink frame constituent section 13A sequentially distributes the data divided into units having SS (Sampling Size) bytes among a plurality of transmission channels CH1-CHn (n is a positive integer equal to or smaller than 8). When the quantity of data having SS bytes distributed to each of the transmission channels CH1-CHn reaches to SPF (Samples Per Frame), the multilink frame constituent section 13A forms a set of data (hereinafter referred to as "payload PL") from the data (having SS bytes) in the quantity equal to SPF distributed to the transmission channel. Then, the multilink frame constituent section 13A provides a synchronization flag F and header information H associated with the payload PL to the same to generate one multilink frame MF. That is, the multilink frame MF includes the synchronization flag F, the header information H, and the payload PL having SS bytes×SPF (multiplication result of SS and SPF). The multilink frame constituent section 13A transmits the generated multilink frame MF to another data transmission apparatus through a transmission channel associated with the multilink frame MF. Such a dividing process makes it possible to transmit one item of multiplex data on a plurality of transmission channels on a divided basis.

Figure 3A:
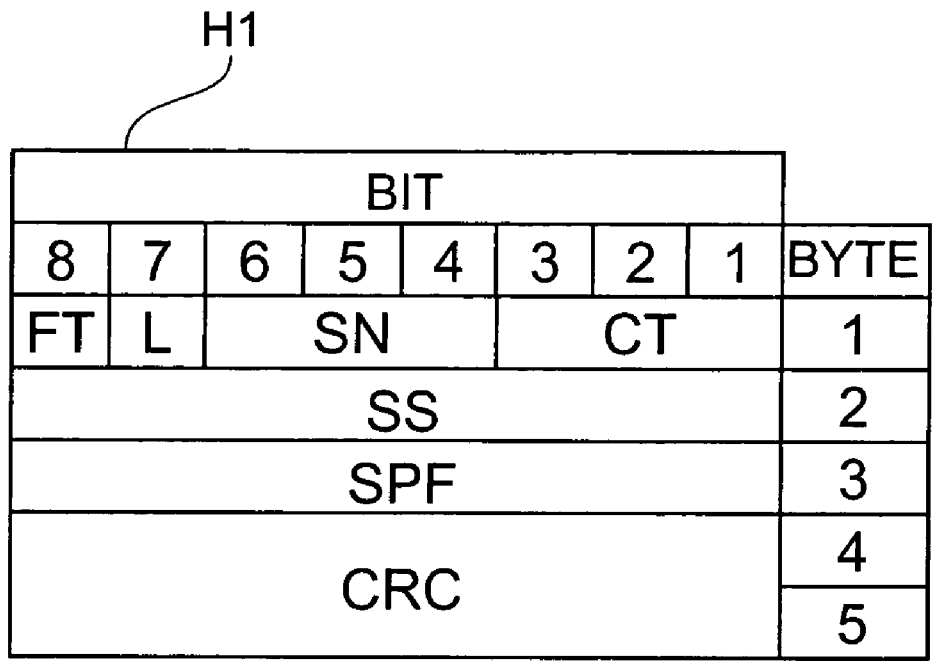
FIG. 3A is a conceptual view illustrating a full header information.
Figure 3B:
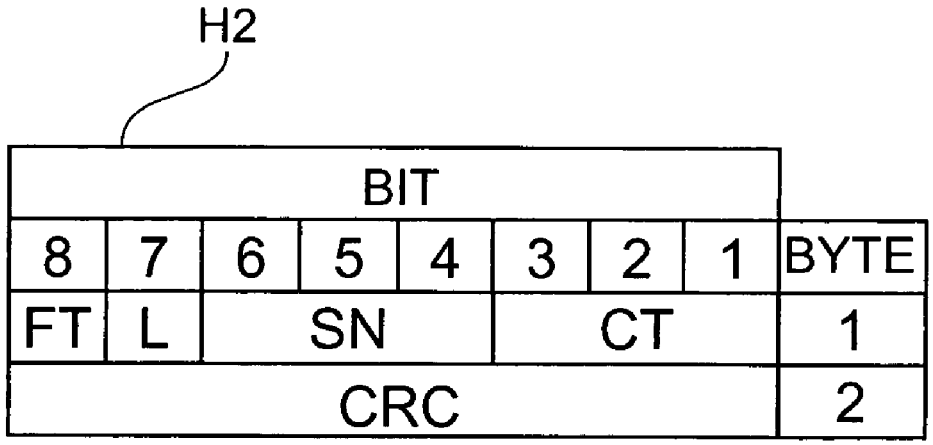
FIG. 3B is a conceptual view illustrating a compressed header information.

FIGS. 3A and 3B show a conceptual view illustrating header information by way of example, and header information will be described with reference to the figures. Header information H includes full header information H1 and compressed header information H2. Stored in the first byte of the full header information Hi shown in FIG. 3A are a number (CT: Channel Tag) indicating the channel on which the multilink frame MF including the full header information H1 is transmitted, a number (SN: Serial Number) indicating the place of the multilink frame MF in the order of transmissions, a flag (L: Last) indicating that the multilink frame MF is transmitted on the channel having the greatest channel number (CT) from among channels to be used as transmission channels for multilink communication, and a flag (FT: Frame Type) indicating the type of the multilink frame. In terms of types of multilink frames MF, there are multilink frames MF for control data and multilink frames MF for common data such as video and audio data. SS (the number of bytes) indicating the size of one item of divided data stored in the multilink frame MF is stored in the second byte of the full header information H1. SPF (value indicative of the number) indicating the number of items of divided data stored in the multilink frame MF is stored in the third byte of the full header information H1. A CRC (Cyclic Redundancy Check) information indicating whether the header information H has been properly transmitted or not, is stored in the fourth and fifth bytes of the full header information H1.

CT, SN, L, and FT as described above are stored in the first byte of the compressed header information H2 shown in FIG. 3B, and CRC information is stored in the second byte of the same. Thus, SS and SPF included in the full header information H1 are not stored in the compressed header information H2.

In the present embodiment, since SS and SPF stored in an SS/SPF table to be described later are used, only the header information H2 is used as the header information H. This makes it possible to reduce data to be transmitted.

Figure 4:
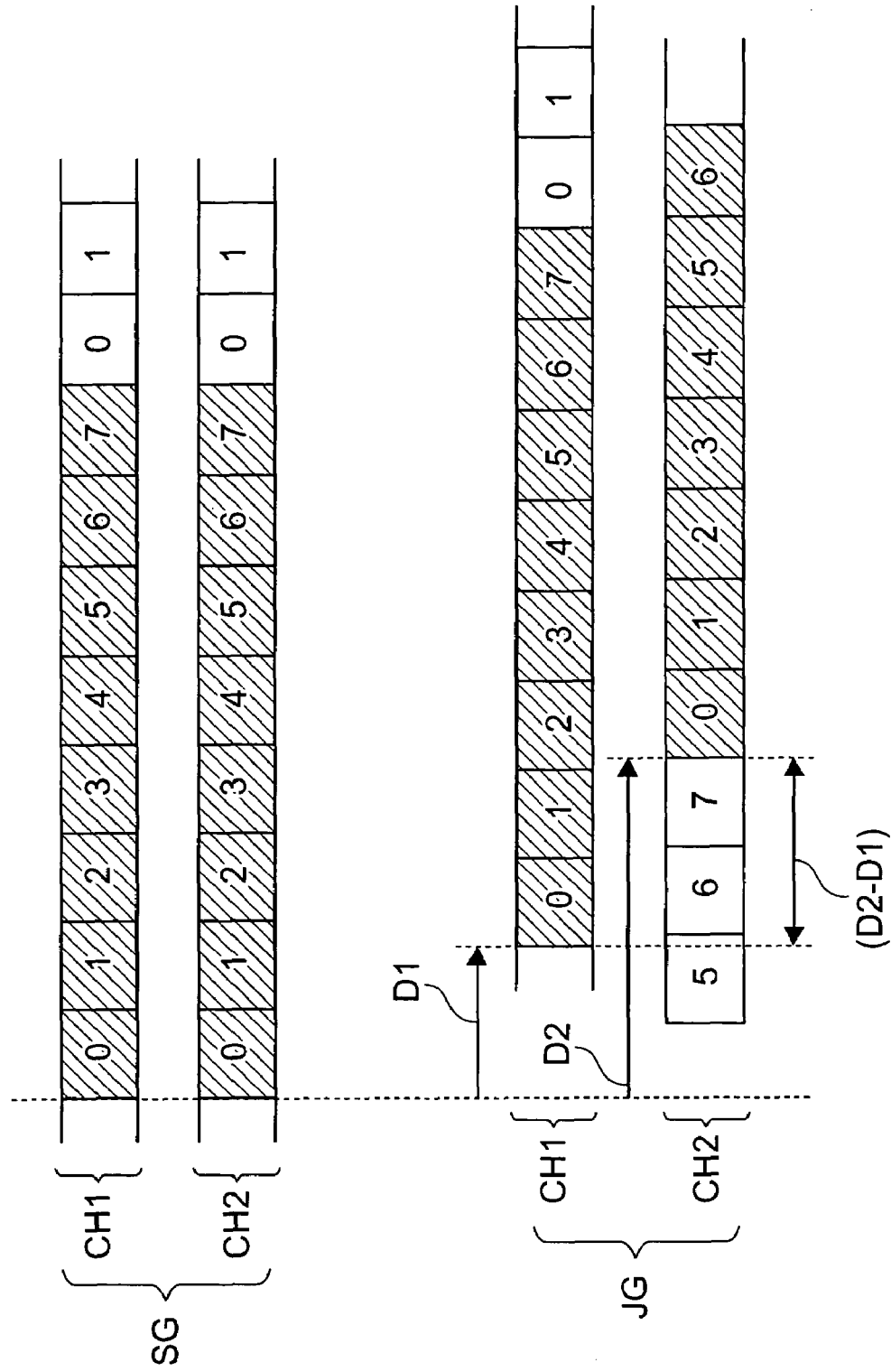
FIG. 4 is explanatory view illustrating a multilink frame decoding section.

The combining process at the multilink frame decoding section 13B will now be described with reference to FIG. 4. For sake of simplicity, there will be made the description of a case where multilink communication is performed on two transmission channels CH1 and CH2. For convenience, the multilink frames MF shown in FIG. 4 are indicated by numbers (SNs) representing the order in which the multilink frames MF have been transmitted, and numerals 0 to 7 are assigned to them as SNs. The flags L of the multilink frames MF transmitted on the transmission channel CH1 shown in FIG. 4 are in an OFF-state, and the flags L of the multilink frames MF transmitted on the transmission channel CH2 are in an ON-state. Specifically, since the channel number (CT) of the transmission channel CH1 is "1" and the channel number (CT) of the transmission channel CH2 is "2", the flags L of the multilink frames MF transmitted on the transmission channel CH2 that is the channel having the greatest channel number (CT) are set in the ON-state.

First, the multilink frame decoding section 13B of a data transmission apparatus 1 at a receiving end JG retrieves synchronization flags F from the multilink frames MF received from each of the transmission channels CH1 and CH2. When synchronization flags F are detected from the multilink frames MF received from each of the transmission channels CH1 and CH2, the multilink frame decoding section 13B refers to numbers SN and flags L included in compressed header information H2 following the detected synchronization flags F. The multilink frame decoding section 13B decides that multilink frames MF received from the transmission channels CH1 and CH2 respectively are multilink frames MF which have been transmitted from a data transmission apparatus 1 at a transmitting end SG at the same timing when those multilink frames MF have the same SN made clear as a result of the reference made to the numbers SN and flags L included in the compressed header information H2. To be more specific for explanation, let us assume that a differential delay D2–D1 has occurred between the transmission channels CH1 and CH2 as shown in FIG. 4. Then, the multilink frame decoding section 13B of the data transmission apparatus 1 at the receiving end JG detects the synchronization flag F of the multilink frame MF whose SN is "0" on the channel CH1 when D1 [msec] has passed since the beginning of transmission and detects the synchronization flag F of the multilink frame MF whose SN is "0" on the channel CH2 when D2 [msec] has passed since the beginning of transmission. In this case, the multilink frame decoding section 13B decides that those multilink frames MF are multilink frames MF which have been transmitted at the same timing from the data transmission apparatus 1 at the transmitting end SG. The multilink frame decoding section 13B of the data transmission apparatus 1 at the receiving end JG decides that the transmission channel transmitting the multilink frames MF with flags L in the ON-state is the channel having the greatest channel number (CT) among the channels used as transmission channels for the multilink communication, i.e., the last transmission channel for the multilink communication. Thus, the data received on the transmission channels CH1 and CH2 can be combined into one item of multiplex data by synchronizing the multilink frames MF transmitted on the transmission channels CH1 and CH2. Specifically, the data received from the channels CH1 and CH2 can be combined into one item of multiplex data by alternately combining every SS bytes of the divided data included in the synchronized multilink frames MF from those channels in the order of the channel numbers (CT). The data having been divided from multiplex data by the data transmission apparatus at the transmitting end SG can be thus restored to obtain the original multiplex data.

Next, the deciding section 14 shown in FIG. 1 decides whether there has been any increase or decrease in the number of transmission channels used for multilink communication based on compressed header information H2 included in multilink frames MF received from another data transmission apparatus (a deciding process).

Figure 5:
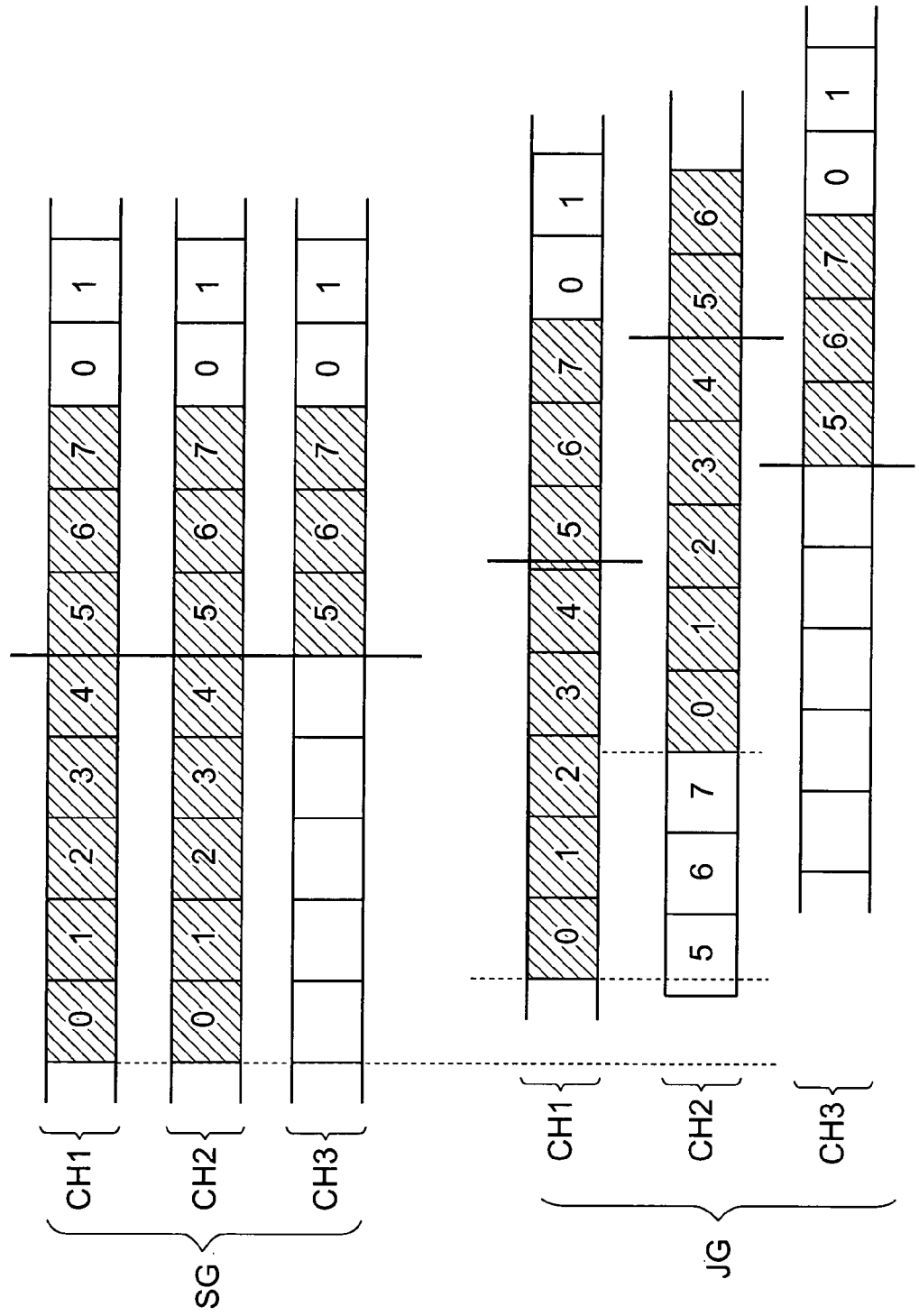
FIG. 5 is an explanatory view illustrating a function of a deciding section.

The deciding process at the deciding section 14 will now be described with reference to FIG. 5. For sake of simplicity, there will be made the description of a case where a new transmission channel CH3 is added as an object of multilink communication when the multilink communication is performed using two transmission channels CH1 and CH2. In terms of the multilink frames MF shown in FIG. 5 there are shown the numbers (SNs) representing the order in which the multilink frames MF have been transmitted, and numerals 0 to 7 are assigned to them as SNs.

In terms of the multilink frames MF having SNs from "0" to "4" among the multilink frames MF transmitted from the transmitting end SG on the transmission channels CH1 and CH2, the flags L of the multilink frames MF transmitted on the transmission channel CH1 are set in the OFF-state, and the flags L of the multilink frames MF transmitted on the transmission channel CH2 are set in the ON-state. Specifically, since the channel number (CT) of the transmission channel CH1 is "1" and the channel number (CT) of the transmission channel CH2 is "2", the flags L on the transmission channel CH2 that is the channel having the greatest channel number (CT) are set in the ON-state. As described above, the flags L are flags indicating that the multilink frames MF are transmitted by the transmission channel having the greatest channel number (CT) from among transmission channels used for multilink communication.

After the multilink frames MF with the SN "4" are transmitted from the transmitting end SG, a transmission channel CH3 is newly added as a transmission channel for the multilink communication. In this case, the multilink section 13 of the data transmission apparatus at the transmitting end SG changes the state of the flags L of the multilink frames MF transmitted on the channel CH2 thereafter (starting with the frame having the SN "5") from ON to OFF and sets the flag L of multilink frames MF transmitted on the channel CH3 in the ON-state. Specifically, since the channel number (CT) of the channel CH3 is "3", the flags L of the multilink frames MF transmitted on the channel CH3 having the greatest channel number (CT) is set in the ON-state.

In terms of the multilink frames MF having SNs from "0" to "4" among the multilink frames MF received from the transmission channels CH1 and CH2 at the receiving end JG, the flags L of the multilink frames MF received from the transmission channel CH1 are set in the OFF-state, and the flags L of the multilink frames MF received from the transmission channel CH2 are set in the ON-state. Therefore, the multilink frame constituent section 13A of the data transmission apparatus at the receiving end JG synchronizes the multilink frames MF received from the transmission channels CH1 and CH2 respectively to combine the data received from the channels CH1 and CH2 into one item of multiplex data. At this time, the multilink frame decoding section 13B of the data transmission apparatus at the receiving end JG decides that the multilink frames MF received from the transmission channel CH2 are multilink frames MF which have been received from the last transmission channel for the multilink communication. When such a decision is made, the multilink frame decoding section 13B of the data transmission apparatus at the receiving end JG increments the SN value to identify the next multilink frames MF to be subjected to the synchronizing process.

Next, the multilink frame decoding section 13B of the data transmission apparatus at the receiving end JG synchronizes multilink frames MF having the SN "5" based on multilink frames MF received from the transmission channels CH1 and CH2 respectively. In this case, the multilink frame decoding section 13B of the data transmission apparatus at the receiving end JG detects that the flags L of the multilink frame MF received from the transmission channel CH2 has been changed from the ON-state to the OFF-state and recognizes that a multilink frame MF having the SN "5" is received also from the transmission channel CH3. Therefore, the multilink frame decoding section 13B of the data transmission apparatus at the receiving end JG recognizes that the last transmission channel for the multilink communication has been changed from the transmission channel CH2 to the transmission channel CH3 by confirming that the flag L of the multilink frame MF (having the NS "5") received from the transmission channel CH3 is in the ON-state. That is, it recognizes that the number of transmission channels has increased from two to three.

In terms of a reduction in the number of transmission channels, when it is detected that the flag L of a multilink frame MF transmitted on a certain transmission channel has changed from the OFF-state to the ON-state in a manner similar to that in the case of an increase of the channels, it may be recognized that transmission channels having channel numbers (CT) greater than that of the transmission channel which transmitted the multilink frame MF have been excluded from the multilink communication.

Although an increase in the number of transmission channels is decided based on the contents of the flag L, the decision on an increase in the number of channels is not limited to the same, and the decision may be made based on, for example, the channel number (CT) of a multilink frame MF received from a transmission channel. Specifically, when the channel number (CT) of the received multilink frame MF is different from the channel numbers (CT) of multilink frames MF which have been received, the addition of the new transmission channel may be recognized.

Next, the channel input/output section 15 shown in FIG. 1 changes the size of the payload PL included in one multilink frame MF on referring to an SS/SPF table based on the number of transmission channels involved in multilink communication. The channel input/output section 15 changes the size of the payload PL when there is an increase or decrease in the number of transmission channels involved in multilink communication or when the increase or decrease in the number of transmission channels is confirmed. The timing of such a change is not limited to the time when the number of transmission channels is increased or decreased and the time when the increase or decrease in the number of transmission channels is confirmed. For example, the size of the payload PL may be changed when several frames (a certain volume of transmission data) have been transmitted and received over each transmission channel after the occurrence of a change in the number of transmission channels or the confirmation of the change in the number of transmission channels. By introducing such a time lag between a change in the number of transmission channels and a change in the size of the payload PL, the size of the payload PL can be reliably changed even when a delay occurs between the transmission channels.

An SS/SPF table will now be described with reference to FIGS. 6A and 6B. As shown in FIGS. 6A and 6B, an SS/SPF table T has a plurality of SS/SPF records R each of which is a set of a number of transmission channels, an SS value, and an SPF value associated with each other.

Referring to the SS/SPF table T shown in FIG. 6A, each value stored in the table is set such that the size (data volume) of a payload PL calculated from a pattern expressed by "SS' SPF" (a pattern of data division) increases with the number of transmission channels. For example, patterns of SS and SPF values are set in the SS/SPF table T taking into account the fact that the likelihood of the occurrence of a delay between transmission channels increases with the number of transmission channels. Specifically, even when a delay occurs between transmission channels as a result of an increase in the number of transmission channels, it is possible to reduce situations in which synchronization between multilink frames MF fails by increasing the size of the payloads included in the multilink frames MF.

Referring to the SS/SPF table T shown in FIG. 6B, each value stored in the table is set such that the size of a payload PL calculated from a pattern expressed by "SS ' SPF" (a pattern of data division) increases with the number of transmission channels. For example, SS and SPF values are set in the SS/SPF table T taking into account a case in which the capacity of a reception buffer at a receiving end is small and in which all transmission channels use the reception buffer in common. Specifically, even when a reception buffer capacity allocated to one channel decreases as a result of an increase in the number of transmission channels, it is possible to reduce situations in which a shortage of a reception buffer occurs by decreasing the size of payloads included in multilink frames MF.

For example, such an SS/SPF table T is generated by either of a data transmission apparatus at a transmitting end and a data transmission apparatus at a receiving end, based on the buffer capacity of the either data transmission apparatus. The apparatus then notifies the other apparatus of the contents of the table thus generated, and both of the apparatus thus have SS/SPF tables whose contents coincide with each other.

The functional arrangement of the data transmission apparatus 1 is not limited to the arrangement shown in FIG. 1. For example, a transmitter for data transmission may be arranged which has a video encoding section 11Aa, an audio encoding section 11Ba, a communication control section 11C, a multiplexing section 12A, a multilink frame constituent section 13A, a deciding section 14, and a channel input/output section 15. A receiver for data transmission may be arranged which has a video decoding section 11Ab, an audio decoding section 11Bb, a communication control section 11C, a demultiplexing section 12B, a multilink frame decoding section 13B, a deciding section 14, and a channel input/output section 15.

Figure 7:
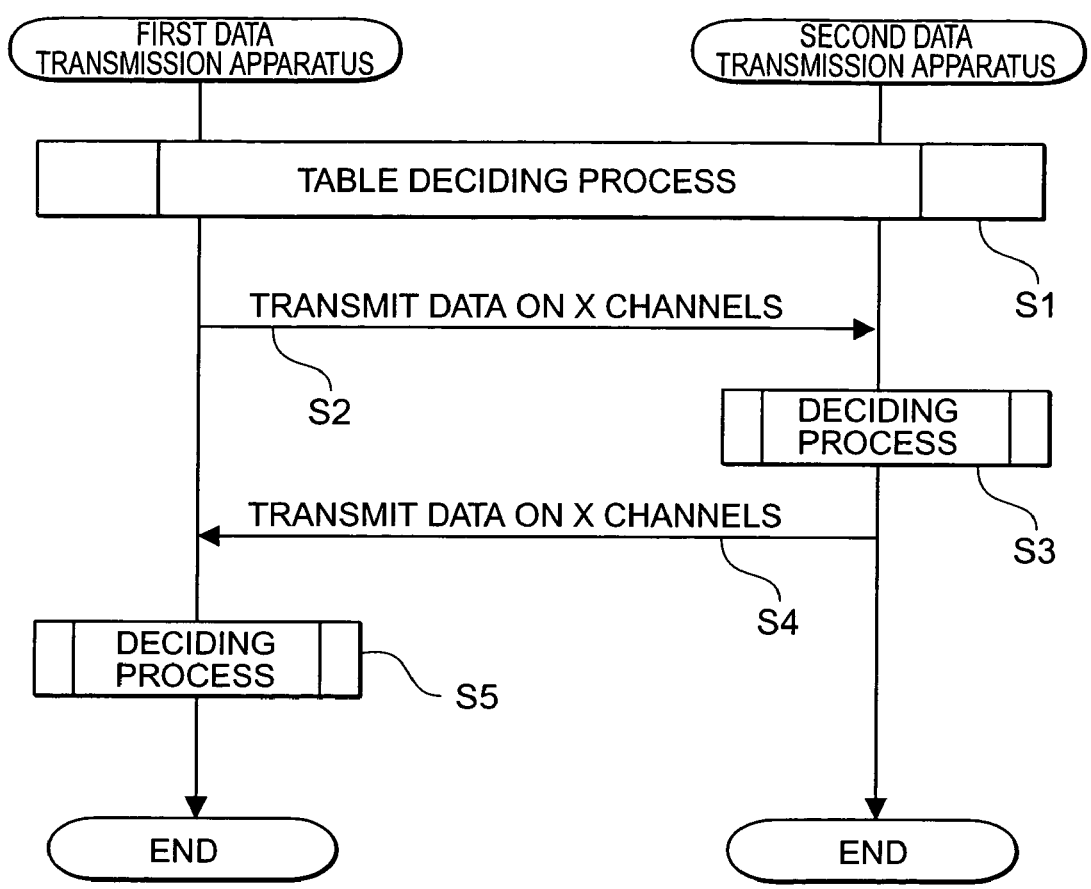
FIG. 7 is a flow chart showing operations of a data transmission apparatus of the embodiment.
Figure 8:
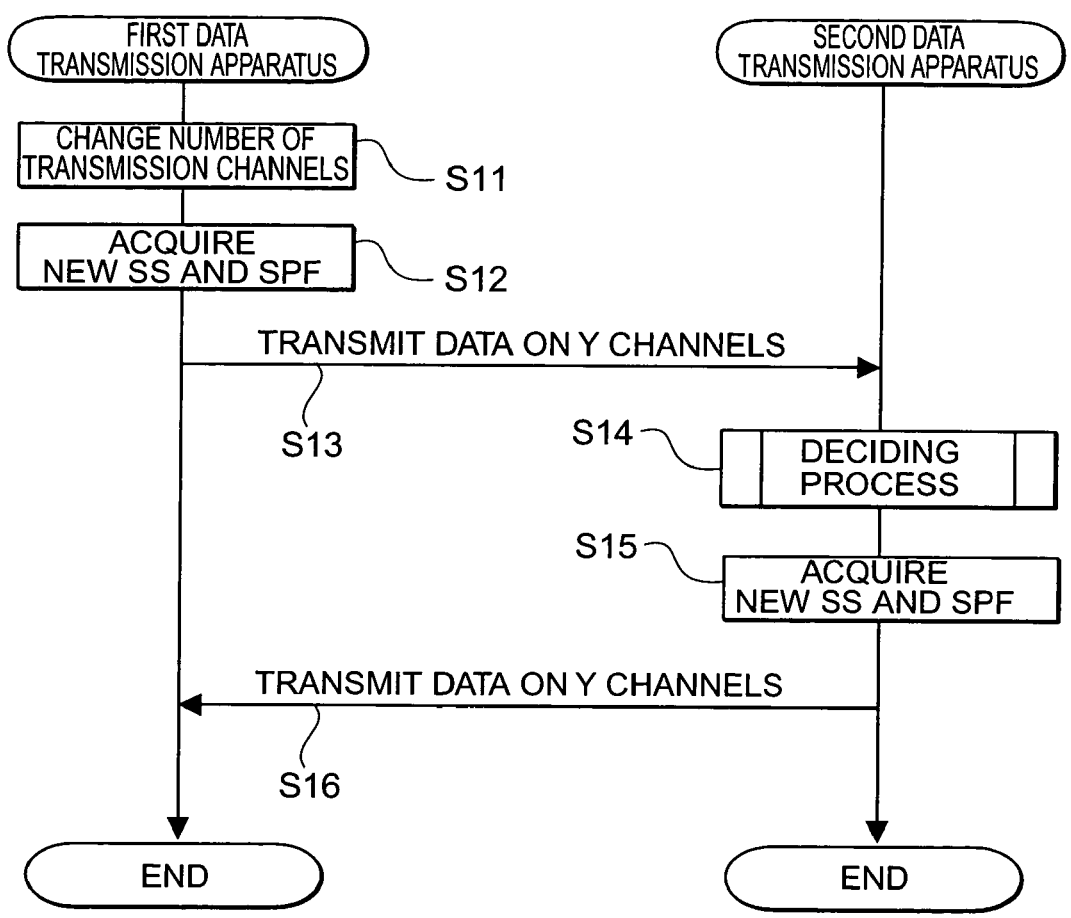
FIG. 8 is a flow chart showing operations of the data transmission apparatus of the embodiment.

Operations of the data transmission apparatus according to the present embodiment will now be described with reference to FIGS. 7 to 10. First, operations of the data transmission apparatus will be schematically described with reference to FIGS. 7 and 8. FIG. 7 is a sequence chart showing operations during multilink communication for which no change is made in the number of transmission channels between the data transmission apparatus. FIG. 8 is a sequence chart showing operations that take place when the number of transmission channel is changed during multilink communication between the data transmission apparatus. The operations described are operations performed between the terminals when video data and audio data are transmitted and received between the data transmission apparatus using a plurality of channels allocated for multilink communication.

First, as shown in FIG. 7, a table determining process for determining the contents of an SS/SPF table T is performed between a first data transmission apparatus and a second data transmission apparatus (step S). Details of the table determining process will be described later.

Next, the first data transmission apparatus generates multilink frames MF based on the SS/SPF table T decided by the table deciding process and transmits data including the multilink frames MF to the second data transmission apparatus through a plurality of transmission channels CH1-CHx (x is a positive integer). Specifically, the first data transmission apparatus generates the multilink frames MF based on SS and SPF associated with the number of channels "x" and transmits the data to the second data transmission apparatus using "x" transmission channels.

Next, the second data transmission apparatus receives the data transmitted by the first data transmission apparatus and performs a deciding process for deciding whether there has been an increase or decrease in the number of transmission channels based on channel numbers (CT) and flags L included in compressed header information H2 in the received multilink frames MF (step S3). Details of the deciding process will be described later.

When it is decided by the deciding process that the number of transmission channels has been neither increased nor decreased, the second data transmission apparatus generates multilink frames MF based on the SS/SPF table T and transmits data including the multilink frames MF to the first data transmission apparatus 1 through the plurality of transmission channels CH1-CHx (step S4).

Next, the first data transmission apparatus receives the data transmitted by the second data transmission apparatus and performs a deciding process for deciding whether there has been an increase or decrease in the number of transmission channels based on channel numbers (CT) and flags L included in compressed header information H2 in the received multilink frames MF (step S5). When it is decided by the deciding process that the number of transmission channels has been neither increased nor decreased, the first data transmission apparatus continues data transmission to the second data transmission apparatus as it is.

Thus, the multilink communication using "x" transmission channels is continued between the first data transmission apparatus and the second data transmission apparatus.

With reference to FIG. 8, there will now be made the description of a case where the number of transmission channels is changed during multilink communication performed between the first data transmission apparatus and the second data transmission apparatus. The operations described are operations that take place when multilink communication using "x" transmission channels is changed to multilink communication using "y" (y is a positive integer) transmission channels.

First, the first data transmission apparatus changes the number of transmission channels involved in multilink communication from "x" to "y" (step S11). Next, the first data transmission apparatus acquires a pattern of SS and SPF associated with the number of transmission channels "y" from the SS/SPF table T (step S12). Then, it generates multilink frames MF based on the acquired SS and SPF and transmits data including the multilink frames MF to the second data transmission apparatus through the transmission channels CH1-CHy thus changed (step S13). That is, the first data transmission apparatus transmits the data to the second data transmission apparatus using "y" transmission channels.

Next, the second data transmission apparatus receives the data transmitted by the first data transmission apparatus and performs a deciding process for deciding whether there has been an increase or decrease in the number of transmission channels based on channel numbers (CT) and flags L included in compressed header information H2 in the received multilink frames MF (step S14). Details of the deciding process will be described later.

When it is decided by the deciding process that the number of transmission channels has been changed from "x" to "y", the second data transmission apparatus acquires the pattern of SS and SPF associated with the number of transmission channels "y" from the SS/SPF table T (step S15). Then, the second data transmission apparatus generates multilink frames MF based on the acquired SS and SPF and transmits data including the multilink frames MF to the first data transmission apparatus through the plurality of transmission channels CH1-CHy (step S16).

Even when the number of transmission channels is changed from "x" channels to "y" channels as thus described, there can be used, as header information of multilink frames, a compressed header information H2 in which neither SS nor SPF is stored, since the pattern of SS and SPF associated with the updated number of transmission channels "y" can be acquired from the SS/SPF table T. This makes it possible to improve transmission efficiency of channels during multilink communication. The load of processing can be reduced by providing in advance the SS/SPF table T in which patterns of SS and SPF are stored because SS and SPF values can be changed by acquiring a pattern of SS and SPF from the table according to a change in the number of transmission channels.

Figure 9:
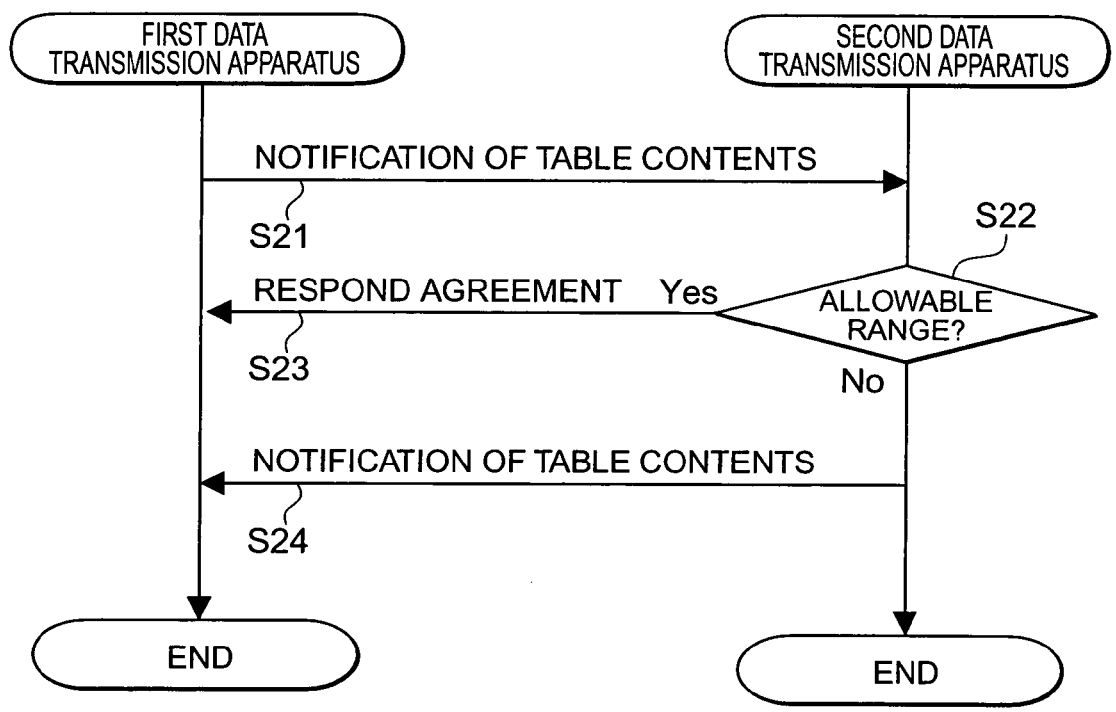
FIG. 9 is a flow chart showing operations of the data transmission apparatus of the embodiment.

Operations at the above-described table determining process will now be described with reference to FIG. 9. First, the first data transmission apparatus notifies the second data transmission apparatus of contents of an SS/SPF table T which have been generated taking into account the buffer capacity and terminal capabilities of the first apparatus itself during reception and transmission (step S21).

Next, the second data transmission apparatus decides whether the contents of the SS/SPF table T received from the first data transmission apparatus are in an allowable range with respect to the buffer capacity and terminal capability of the second apparatus itself during reception and transmission (step S22). If the decision is YES (step S22; YES), the second data transmission apparatus makes a response indicating that it agrees to the contents of the SS/SPF table T received from the first data transmission apparatus (step S23).

If it is decided at step S22 that the contents are out of the allowable range (step S22; NO), the second data transmission apparatus notifies the first data transmission apparatus of contents of the SS/SPF table T which have been generated taking into account the buffer capacity and terminal capabilities of the second apparatus itself during reception and transmission (step S24).

According to the data transmission method of the present embodiment, since an SS/SPF table T generated taking into account the buffer capacity and terminal capabilities of each data apparatus during reception and transmission can be used as thus described, multilink communication can be more efficiently performed in accordance with the capabilities of each data transmission apparatus.

When it is decided that an SS/SPF table T received from a data transmission apparatus at the other end of communication is out of an allowable range, a response may be made which indicates that full header information H1 including SS and SPF is to be used as header information H. In this case, multilink communication using full header information H1 may be performed as done in the related art.

Figure 10:
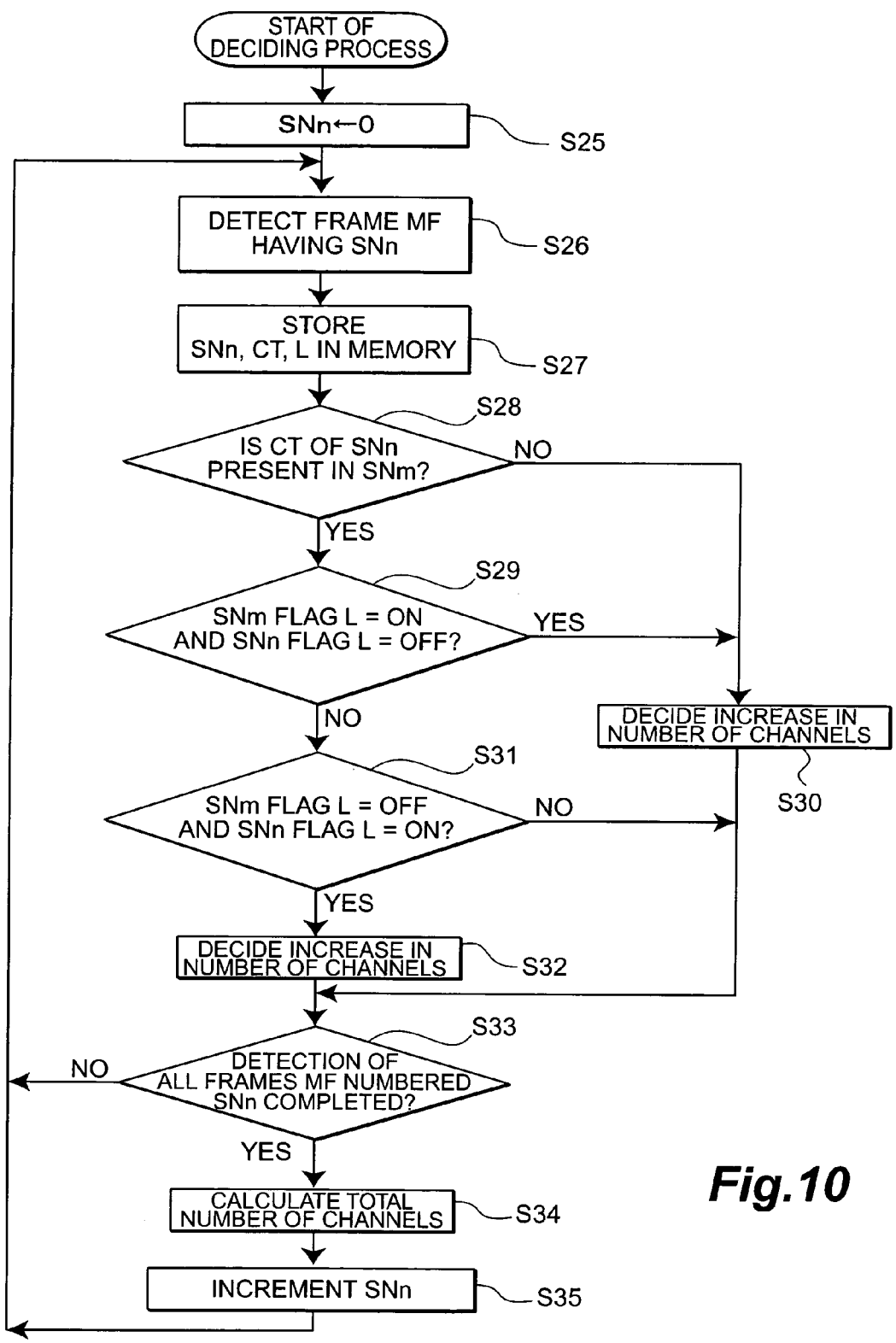
FIG. 10 is a flow chart showing operations of the data transmission apparatus of the embodiment.
Figure 11:
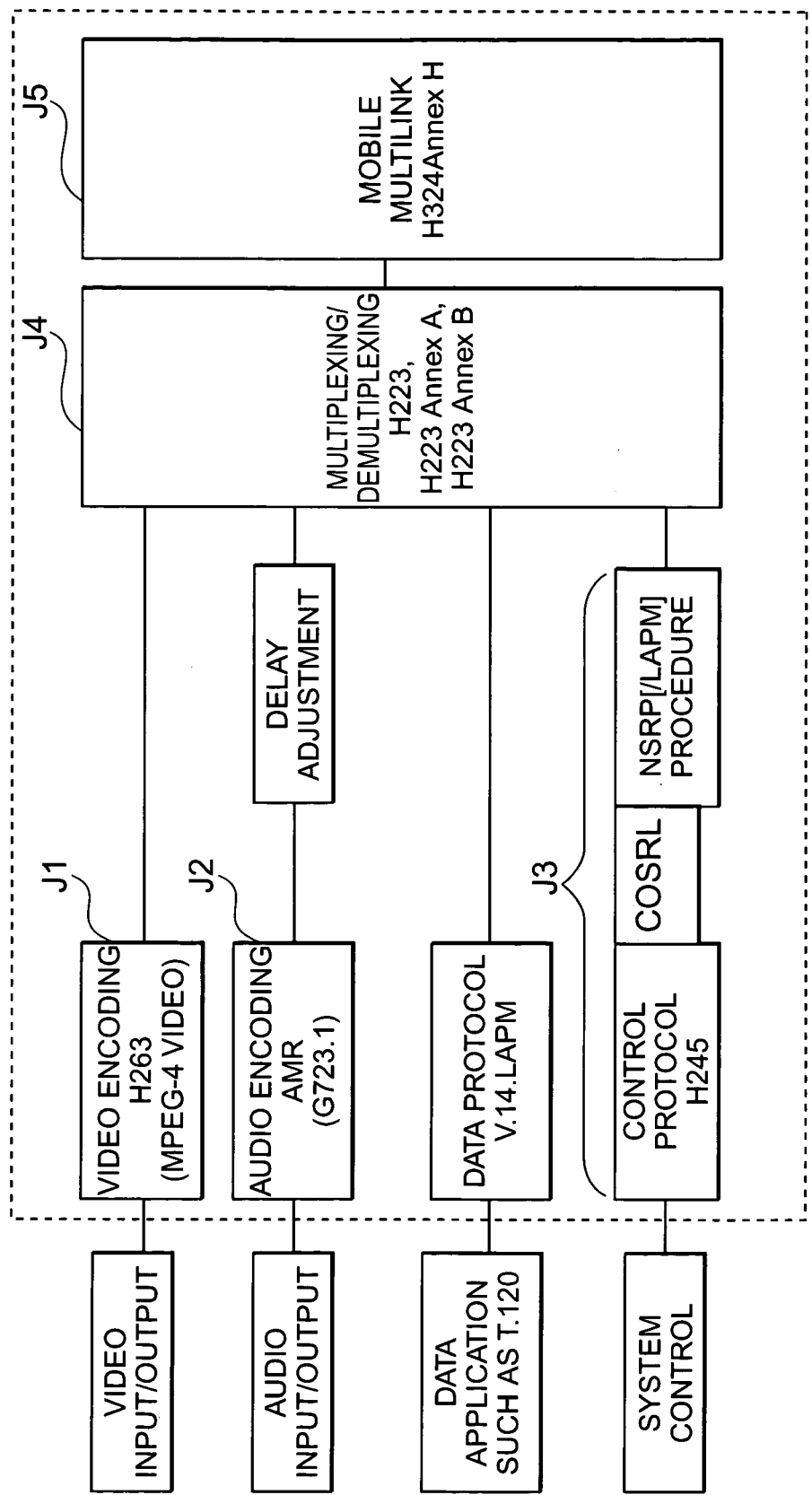
FIG. 11 is a view illustrating a functional arrangement for data transmission in the related art.

Operations of the above-described deciding operation will now be described with reference to FIG. 10. First, a data transmission apparatus sets SNs that are numbers indicating the order of transmission of multilink frames MF, to an initial value "0" (step S25). The SNs in the present embodiment are represented by natural numbers from 0 to 7. The numbers "0" to "7" are sequentially assigned to the SNs as the order in which multilink frames MF have been transmitted, and "7" is followed by "0" from which the numbers are similarly assigned again. In the following description, the SN of a multilink frame which is to be currently subjected to the combining process is represented by SNn, and the SN indicating the place preceding the SNn in the order of transmission is represented by SNm.

Next, the data transmission apparatus detects the multilink frame MF numbered SNn from data stored in the reception buffer thereof (step S26). The data transmission apparatus then stores the channel number (CT) and the flag L included in the detected multilink frame MF in a memory in accordance with the number SNn (step S27).

Next, the data transmission apparatus decides whether the channel number CT associated with the number SNn is present among the channel numbers CT associated with the number SNm (step S28). That is, the data transmission apparatus decides whether the channel number CT associated with the number SNn is a newly detected channel number (CT). The decision is not made at the time of an initial process (a process that is performed when "0" is initially stored as the number SNn at step S25). This is because the number SNm does not exist at the time of the initial process. Process at steps S29 to S32 to be described below are not also performed at the time of the initial process for the same reason.

If the result of the decision at step S28 is NO (step S28; NO), the process proceeds to step S30. If it is decided at step S28 that the channel number CT associated with the number SNn is present among the channel numbers CT associated with the number SNm (step S28; YES), the data transmission apparatus decides whether the flag L associated with the number SNm is in the ON-state and the flag L associated with the number SNn is in the OFF-state (step S29). That is, the data transmission apparatus decides whether the flag L has changed from the ON-state to the OFF-state for the same channel number (CT). If the result of the decision is YES (step S29; YES), the data transmission apparatus decides that the number of transmission channels has been increased (step S30), and the process proceeds to step S33.

If the result of the decision at step S29 is NO (step S29; NO), the data transmission apparatus decides whether the flag L associated with the number SNm is in the OFF-state and the flag L associated with the number SNn is in the ON-state (step S31). That is, the data transmission apparatus decides whether the flag L has changed from the OFF-state to the ON-state for the same channel number (CT) If the result of the decision is YES (step S31; YES), the data transmission apparatus decides that the number of transmission channels has been decreased (step S32). If the result of the decision at step S31 is NO (step S31; NO), the process proceeds to step S33.

Next, the data transmission apparatus decides whether detection of all multilink frames MF having the number SNn has been completed or not (step S33). Specifically, the detection may be decided, for example, by checking whether a multilink frame MF associated with the number SNn and having a flag L in the ON-state has already been detected and by checking whether all multilink frames MF having channel numbers (CT) equal to or smaller than the channel number (CT) associated with that multilink frame MF have been detected. This is because the channel number (CT) of the multilink frame MF having the flag L in the ON-state is the greatest channel number (CT) for the frames with the number SNn.

If the result of the decision at step S33 is NO (step S33; NO), the data transmission apparatus proceeds to the process at step S26. If it is decided at step S33 that the detection of all multilink frames MF having the number SNn has been completed (step S33; YES), the data transmission apparatus calculates the number of channels currently involved in multilink communication (step S34). Referring to the calculation specifically, for example, the total number of channel numbers CT associated with the number SNn stored in the memory may be calculated as the number of channels.

Next, the data transmission apparatus increments the number SNn, and the process then proceeds to step S26 (step S35).

The size (data volume) of a payload PL included in a multilink frame MF and a pattern of SS and SPF (a pattern of data division) can be controlled based on the number of transmission channels involved in multilink communication as described above. Therefore in the case of a change in the number of transmission channels, the size of the payload PL or the pattern of SS and SPF can be controlled based on the number of transmission channels after that change. That is, data are transmitted using multilink frames MF generated based on a payload PL or a pattern of SS and SPF which is suitable for the number of transmission channels after the change, and the transmission efficiency of the transmission channels during multilink communication can be improved.

Since a pattern of SS and SPF (the size of the payload PL) can be acquired by making reference to an SS/SPF table in which sizes of the payload are stored in accordance with numbers of transmission channels, a multilink frame MF may have only compressed header information H2 as header information. This eliminates a need for using full header information as the header information of the multilink frame, and the transmission efficiency of the channel can therefore be improved during multilink communication. Further, since SS and SPF values can be easily changed by acquiring a pattern of SS and SPF in accordance with a change in the number of transmission channels from the SS/SPF table, the load of processing can be reduced.

A data receiving end according to Recommendation H.324 Annex H checks whether the size of a payload has been changed or not with reference to header information of all multilink frames received. According to the invention, since only compressed header information is used as header information of multilink frames, there is no need for referring to header information of all multilink frames to check whether the payload size has been changed. Therefore, the load of processing can be reduced accordingly.

The data transmission method and data transmission apparatus of the invention make it possible to improve the transmission efficiency of channels involved in multilink communication and to reduce the load of processing.

What is claimed is:

1. A data transmission method, comprising:
   dividing data to be transmitted, and distributing the divided data among a plurality of transmission channels to transmit the data in units, each having a predetermined data volume, at a transmitting terminal; and
   receiving the data distributed among and transmitted on the plurality of transmission channels, and combining the received data, at a receiving terminal,
   wherein at least one of the data volume and a pattern of data division are determined at the receiving terminal by accessing a predetermined table using only a number of transmission channels used as the plurality of transmission channels for transmitting the data, the number being detected by the receiving terminal, wherein information indicating the at least one of the data volume and the pattern of data division is not included in a header of the data received by the receiving terminal.

2. The data transmission method according to claim 1, further comprising:
   changing the at least one of the data volume and the pattern of data division used at the receiving terminal for transmission to the transmitting terminal, based on the detected number of transmission channels.

3. The data transmission method according to claim 1, further comprising:
   changing the at least one of the data volume and the pattern of data division based on a plurality of combinations of data volumes and patterns of data division, which are defined in advance, in accordance with the number of transmission channels used as the plurality of transmission channels.

4. The data transmission method according to claim 3, wherein the plurality of combinations of the data volumes and the patterns of data division defined in advance are determined based on a data buffer capacity of one of the transmitting terminal and the receiving terminal.

5. The data transmission method according to claim 4, wherein a notification of the plurality of combinations of the data volumes and the patterns of data division defined in advance is carried out from one of the terminals to the other terminal.

6. The data transmission method according to claim 5, wherein the other terminal, having received the notification, notifies the one of the terminals of its response to the notification.

7. A data transmission apparatus, comprising:
   a dividing unit configured to divide data to be transmitted;
   a transmission unit configured to distribute the divided data among a plurality of transmission channels to transmit the data in units, each having a predetermined data volume, to an external terminal;
   a receiving unit configured to receive data distributed among and transmitted on the plurality of transmission channels from the external terminal;
   a combining unit configured to combine the data received by the receiving unit;
   a deciding unit configured to decide a number of transmission channels used as the plurality of transmission channels by the external terminal based on the combined data; and
   a control unit configured to determine at least one of the data volume and a pattern of data division by accessing a predetermined table using only the number of transmission channels used as the plurality of transmission channels based on the decision made by the deciding unit,
   wherein information indicating the at least one of the data volume and the pattern of data division is not included in a header of the data received by the receiving unit.

8. The data transmission apparatus according to claim 7, wherein the control unit determines the at least one of the data volume and the pattern of data division based on a plurality of combinations of data volumes and patterns of data division defined in advance, in accordance with the number of transmission channels used as the plurality of transmission channels.

9. A data transmission system for transmitting and receiving data between a first data transmission apparatus and a second data transmission apparatus,
   the first data transmission apparatus comprising:
   a dividing unit configured to divide data to be transmitted; and
   a transmission unit configured to distribute the divided data among a plurality of transmission channels to transmit the data in units, each having a predetermined data volume, to an external terminal,
   the second data transmission apparatus comprising:
   a receiving unit configured to receive data distributed among and transmitted on the plurality of transmission channels from the external terminal;
   a combining unit configured to combine the data received by the receiving unit;
   a deciding unit configured to decide a number of transmission channels used as the plurality of transmission channels based on the combined data; and
   a control unit configured to determine at least one of the data volume and a pattern of data division by accessing a predetermined table using only the number of transmission channels used as the plurality of transmission channels, based on the decision made by the deciding unit,
   wherein information indicating the at least one of the data volume and the pattern of data division is not included in a header of the data received by the receiving unit.

* * * * *